(12) United States Patent
Cardinal et al.

(10) Patent No.: US 7,999,406 B2
(45) Date of Patent: Aug. 16, 2011

(54) WIND TURBINE PLANT HIGH WIND DERATING CONTROL

(75) Inventors: Mark E. Cardinal, Altamont, NY (US);
Kirk Gee Pierce, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 541 days.

(21) Appl. No.: 12/040,245

(22) Filed: Feb. 29, 2008

(65) Prior Publication Data

US 2009/0218818 A1    Sep. 3, 2009

(51) Int. Cl.
*H02P 9/04* (2006.01)
(52) U.S. Cl. .......................................... 290/44; 290/55
(58) Field of Classification Search .................. 290/44, 290/54, 55; 416/1, 132 B; 415/7, 4.1, 2.1, 415/4.2, 4.3, 4.5, 907, 905, 906
See application file for complete search history.

(56) References Cited

U.S. PATENT DOCUMENTS

| | | | | |
|---|---|---|---|---|
| 4,700,081 A * | 10/1987 | Kos et al. | | 290/44 |
| 5,155,375 A * | 10/1992 | Holley | | 290/44 |
| 6,724,097 B1 * | 4/2004 | Wobben | | 290/44 |
| 6,850,821 B2 * | 2/2005 | Weitkamp | | 700/286 |
| 7,071,579 B2 * | 7/2006 | Erdman et al. | | 290/55 |
| 7,119,452 B2 * | 10/2006 | Larsen | | 290/55 |
| 7,586,205 B2 * | 9/2009 | Krueger | | 290/44 |
| 7,603,202 B2 * | 10/2009 | Weitkamp | | 700/287 |
| 7,606,638 B2 * | 10/2009 | Fortmann et al. | | 700/287 |
| 2006/0273595 A1 * | 12/2006 | Avagliano et al. | | 290/44 |
| 2007/0001461 A1 * | 1/2007 | Hopewell | | 290/44 |
| 2007/0090651 A1 * | 4/2007 | Wobben | | 290/44 |
| 2007/0124025 A1 * | 5/2007 | Schram et al. | | 700/287 |
| 2008/0088129 A1 * | 4/2008 | Altemark et al. | | 290/44 |
| 2009/0096211 A1 * | 4/2009 | Stiesdal | | 290/44 |
| 2009/0212563 A1 * | 8/2009 | Morjaria | | 290/44 |

* cited by examiner

*Primary Examiner* — Tho D Ta
(74) *Attorney, Agent, or Firm* — McNees Wallace & Nurick LLC

(57) ABSTRACT

A method for operating a wind turbine plant including providing a plurality of wind turbines each having a turbine rotor including at least one blade mounted to a rotatable turbine shaft and an induction generator having a stator and a rotor coupled to the turbine shaft for rotation therewith. The wind turbine is configurable to provide a variable amount of power. A control is provided capable of communicating with the plurality of wind turbines. A wind speed is measured and a power derating factor is determined in response to the measured wind speed. The determined derating factor is communicated to the plurality of wind turbines. The amount of power generated by each of the plurality of wind turbines is adjusted in response to the power derating factor. A system for operating a wind turbine plant is also disclosed.

18 Claims, 4 Drawing Sheets

WIND TURBINE PLANT HIGH WIND DERATING CONTROL

FIELD OF THE INVENTION

The invention is directed to wind turbine plant operation. In particular, the invention is directed to wind turbine plant operation of a plurality of wind turbine exposed to high wind conditions.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators. Because of the size of the rotors, changes in wind direction and/or speed can result in significant loads on components of the wind turbine. Various techniques exist for reducing the load including, for example, generator torque control and/or controlling the pitch of the blades. In particular, high wind conditions increase the load on the blades such that the known wind turbine systems are required to cut-out or shutdown in order to reduce or eliminate damage to the blades or other wind turbine components.

Historically, wind turbines have been very small contributors to overall power generation to supply electrical grids. The low unit ratings (<100 kW) of previous generations of wind turbines and the uncertain availability of wind sources caused wind turbine generators to be ignored when power grid operators considered the security of the grid. However, wind turbine generators with ratings of 1.5 MW or more are now available. Furthermore, many power generation developers are installing wind turbine plants having large numbers of wind turbines, including plants having 100 or more wind turbines. The cumulative power available from wind farms with 1.5 MW wind turbine generators is comparable to a modern gas turbine generator. Accordingly, wind turbine are increasingly feasible sources of power for conventional power grids. Since current wind turbines have individual cut-out or shutdown wind speed tolerances, high wind events can cause the shut down of large numbers of wind turbines within the wind turbine plant, causing a severe loss of power to the grid and requiring start up of each of the shut-down wind turbines once the high wind event has passed. Wind turbines typically shut down during high wind events, e.g., when the wind speeds exceed about 20 m/s. The wind speed utilized to determine whether shut down is required is often averaged over a particular time frame and higher wind speeds can usually be tolerated for shorter periods of time. Accordingly, there are often two or more wind speeds that are used to determine the shut down threshold e.g., a 25 m/s averaged over 10 minutes and a 28 m/s averaged over 30 seconds and a 30 m/s averaged over 3 seconds. These shut down events unacceptably and suddenly decrease the power available to the grid as well as decrease the revenue provided by operating the equipment at higher wind speeds.

What is needed is a method and system for providing wind turbine plant control and monitoring to operate the wind turbines within the wind turbine plant within greater operational parameters during high wind conditions without damaging the wind turbine components or prematurely or unnecessarily shutting down the wind turbine.

SUMMARY OF THE INVENTION

An aspect of the present disclosure includes a method for operating a wind turbine plant to reduce the impact of high wind events. The method includes providing a plurality of wind turbines each having a turbine rotor including at least one blade mounted to a rotatable turbine shaft and an induction generator having a stator and a rotor coupled to the turbine shaft for rotation therewith. The wind turbine is configurable to provide a variable amount of power. A control is provided and is capable of communicating with the plurality of wind turbines. A wind speed is measured and a power derating factor is determined in response to the measured wind speed. The determined derating factor is communicated to the plurality of wind turbines. The amount of power generated by each of the plurality of wind turbines is adjusted in response to the power derating factor.

Another aspect of the present disclosure includes a wind turbine plant system having a plurality of wind turbines configurable to provide a variable amount of power. The system also includes a control capable of communicating with the plurality of wind turbines and a wind speed measurement device. The control determines a power derating factor in response to a measured wind speed and communicates the power derating factor to the plurality of wind turbines to adjust the amount of power generated by each of the plurality of wind turbines in response to the power derating factor.

An advantage of the present disclosure includes a central wind plant level of control for high wind events. The plant level control permits the wind turbines to operate at a speed, torque range that is determined by the plant level control allowing controlled power generation during high wind events.

Another advantage of the present disclosure is that the power provided during high wind conditions may be maintained and full power may be obtained quickly once the high wind condition subsides and may be obtained without shutdown of individual wind turbines.

Another advantage of the present disclosure is that wind turbines may be operated at higher wind speed conditions without shutdown.

Another advantage of the present disclosure is that that the system may be coordinated with other plant level curtailment functions, such as general curtailment, ramp rate control and grid frequency regulation.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
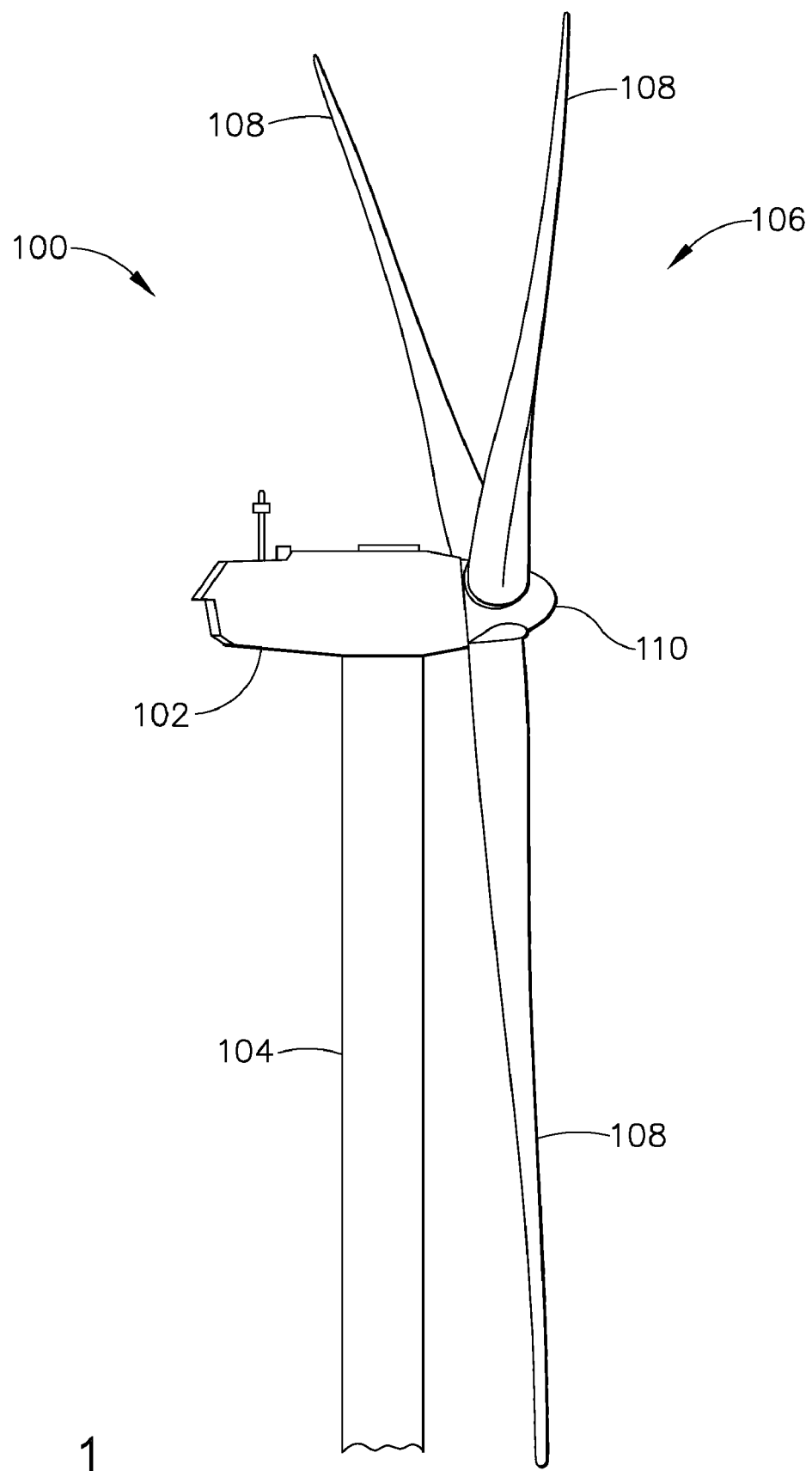
FIG. 1 is a side view of a wind turbine according to an embodiment of the present disclosure.

As shown in FIG. 1, a wind turbine 100 generally comprises a nacelle 102 housing a generator (not shown in FIG. 1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
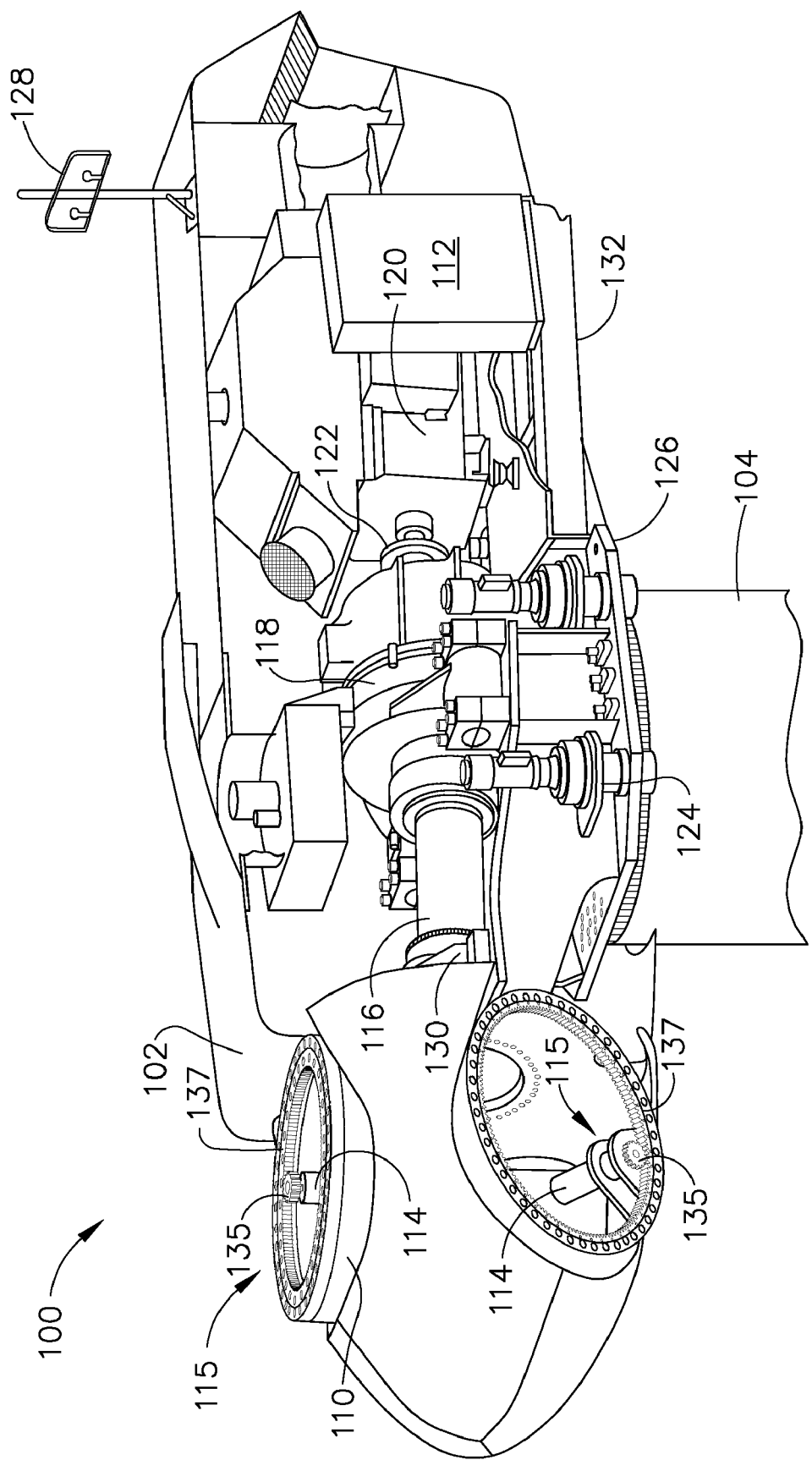
FIG. 2 shows a cutaway view of a nacelle according to an embodiment of the present invention.

As shown in FIG. 2, various components are housed in nacelle 102 atop tower 104 of wind turbine 100. For example, a variable blade pitch drive 114 may control the pitch of blades 108 (not shown in FIG. 2) that drive hub 110 as a result of wind. Hub 110 may be configured to receive three blades 108, but other configurations may utilize any number of blades. In some configurations, the pitches of blades 108 are individually controlled by blade pitch drive 114. Hub 110 and blades 108 together comprise wind turbine rotor 106. The pitch gear assembly 115 is a ring and pinion gear arrangement driven by blade pitch drive 114, having a circular pinion assembly 135 engaging a ring assembly 137. The ring assembly 137 is a single gear with multiple gear teeth arranged in a substantially arcuate arrangement and connected to the blade 108 in a manner that permits adjustment of the pitch of blades 108. The teeth of the pinion assembly 135 mesh with the teeth of the ring assembly 137 and translate the rotational motion provided by the pitch drive 114 through the pinion assembly 135 into the rotational motion of the ring portion 137 that corresponds to pitch angles for the blade 108. The pitch angle adjusts the transmission of force from the wind to the blade 108 and rotor 106, allowing control of rotational speed and torque.

The drive train of the wind turbine 100 includes a main rotor shaft 116 (also referred to as a "low speed shaft") connected to hub 110 via main bearing 130 and (in some configurations), at an opposite end of shaft 116 to a gear box 118. Gear box 118, in some configurations, utilizes a dual path geometry to drive an enclosed high speed shaft. In other configurations, main rotor shaft 116 is coupled directly to generator 120. The high speed shaft (not shown in FIG. 2) is used to drive generator 120, which is mounted on main frame 132. In some configurations, rotor torque is transmitted via coupling 122. Generator 120 may be of any suitable type, for example and without limitation, a wound rotor induction generator or a direct drive permanent magnet generator. In one embodiment, the variable speed system comprises a wind turbine generator with power/torque capability, which is coupled to and supplies generated power to a grid. The generator 120 may include a wound rotor induction generator (WRIG or doubly fed generator (DFG)) and variable speed operation to achieve optimum power output at all wind speeds.

Yaw drive 124 and yaw deck 126 provide a yaw orientation system for wind turbine 100 to rotate the wind turbine 100 to a position that faces the wind. Meterological boom 128 provides information for a turbine control system, including wind direction and/or wind speed. In some configurations, the yaw system is mounted on a flange provided atop tower 104.

Figure 3:
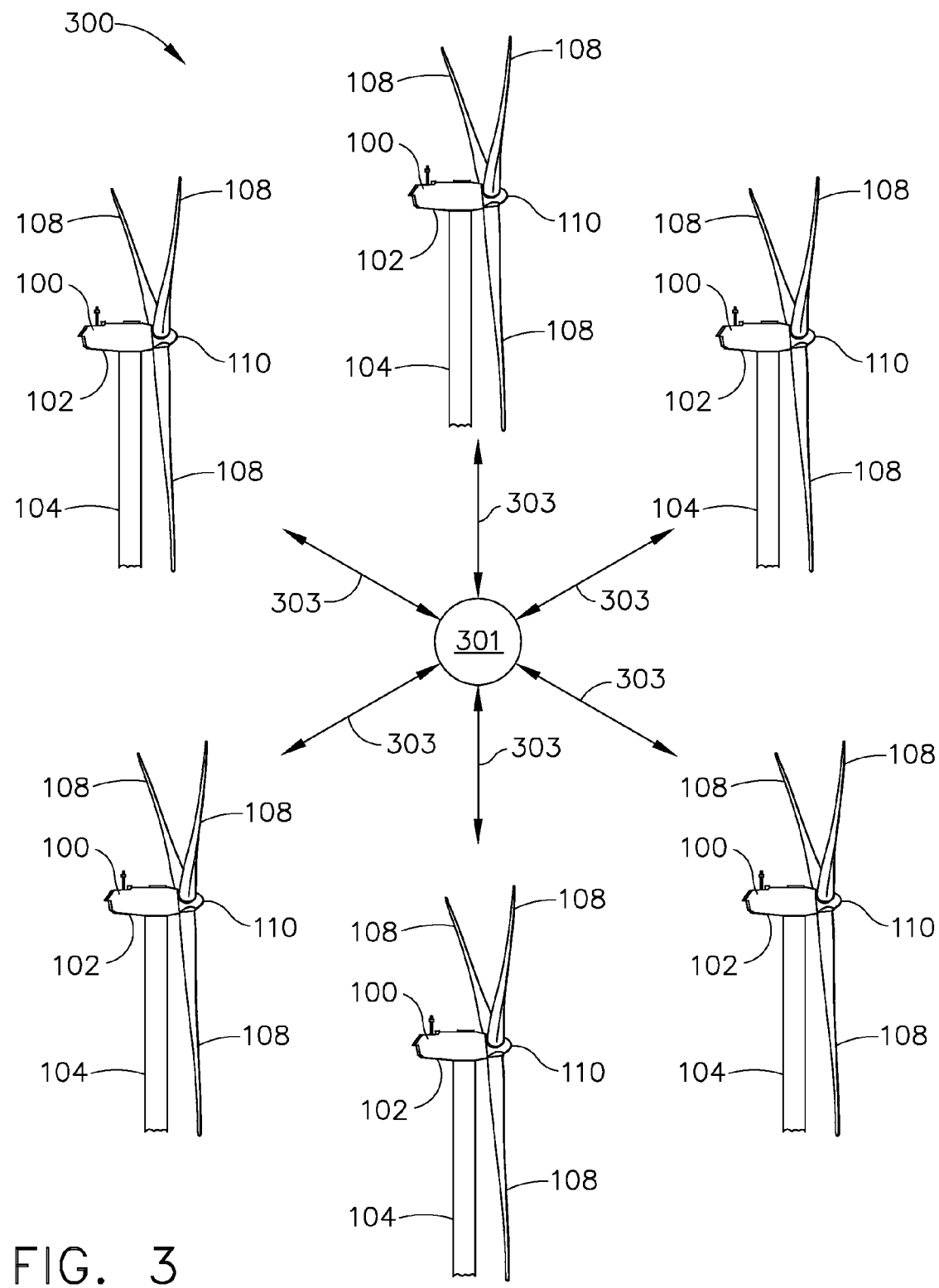
FIG. 3 shows a wind turbine plant system according to an embodiment of the present disclosure.

One embodiment of the present disclosure, as shown in FIG. 3, includes a wind turbine plant system 300. The system 300 includes a plant control 301 and a plurality of wind turbines 100. The number of wind turbines 100 in the system 300 is not limited to the six shown and may include less or more than six wind turbines 100. The system 300 provides a centralized plant control 301 which transmits command signals 303 to the individual wind turbine 100 and provides instruction to derate or otherwise curtail the power generated by the individual wind turbines 100 in response to wind speed and a corresponding derating factor. The derating factor is a percent of rated power and is monitored and controlled by a farm level control and sent to the turbines as a curtailment command. The wind turbines 100 curtail their output by reducing power such that the requested overall operating power is within the load and control capability of the turbine at the present wind conditions. Turbine high wind protection is usually based on steady state wind conditions as well as a faster acting protection for wind gusts.

Generally, the wind turbines do not derate themselves automatically or autonomously without farm level supervision. "Derate", "derating", "derated", and similar grammatical variations, as used herein, includes a factor or value corresponding to power output at the generator. When the derating factor is less than 100%, a reduction or curtailment in the amount of power produced by a wind turbine 100 is requested. Value for the derating factor may also be 100% indicating full power generation for the wind turbine. In one embodiment, the plant control 301 monitors and/or measures the wind speed at a preselected location or locations. For example, the wind speed measurement may be taken from a wind speed sensor located on top of one or more of the wind turbine nacelles 102. In addition to using a measured wind speed, a wind speed derived from a forecasting system that predicts wind speed may also be used. Such wind speeds may be measured at individual wind turbines 100 at the location of plant control 301 or at other locations that provide a suitable wind speed value representative of wind speeds experienced by individual wind turbines 100. For example, the wind speed measurement may be derived from multiple turbine wind speed detectors or higher accuracy meteorological measurement systems located within or near the wind plant 300. Additional measurement points provided failure resistance and increased accuracy of the measured wind speeds.

Figure 4:
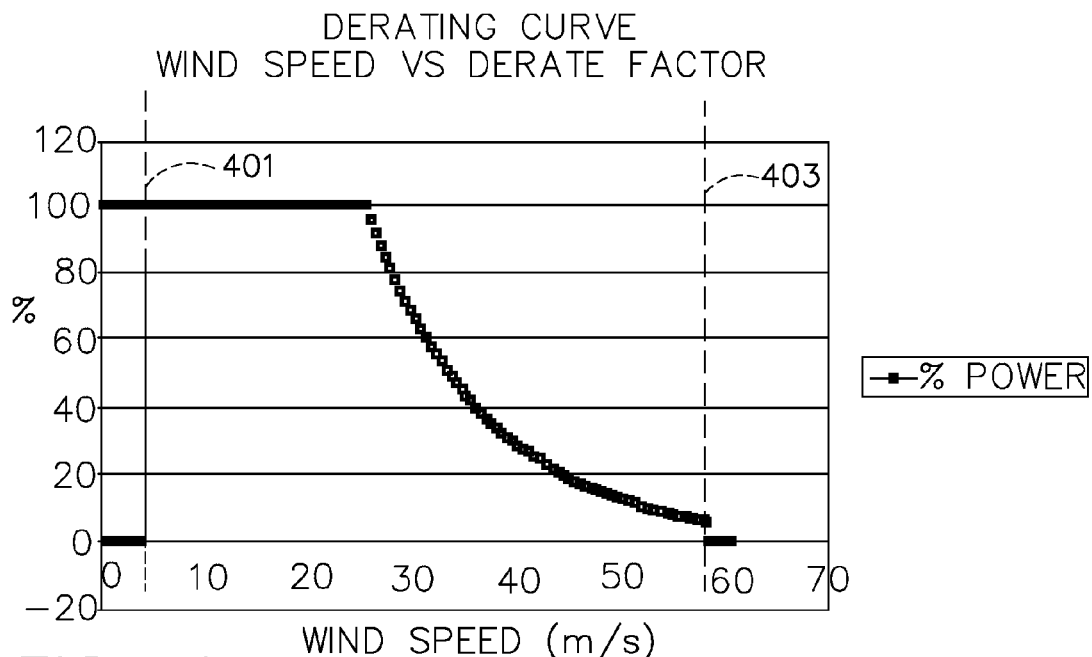
FIG. 4 shows a derating curve showing exemplary wind speed to derating factor correlations for use with the present disclosure.

Plant control 301 correlates the wind speed to a power derating factor on a lookup table, curve or other mathematical relationship (see e.g., FIG. 4). "Correlating" and grammatical variations thereof, as used herein includes mathematically comparing and/or compiling wind speed values and translating the wind speed values to values for power derating by a predetermined algorithm, chart, or relationship. The power derating factors and the relationship between power derating factors and wind speed may be unique to individual wind turbine types, number of wind turbines in a plant, mounting surface topography, or historical data developed for particular wind turbines 100 or wind turbine plants 300. In particular, in response to the derating factor determined, a command signal 303 is sent to all the turbines in the wind plant to reduce their power production. The command signal 303 may be wireless or a wired signal that provides the instructions to control systems of the individual wind turbines 100. The command signals 303 may be single direction or multiple direction signals (as shown in FIG. 3), wherein feedback, operational information, meteorological or other information may optionally be transmitted to plant control 301. For example, the power derating factor may be determined on a curve coordinated with the wind turbines 100 analytical load carrying capability under the various high wind speeds. If the derating factor includes a derating factor value of 100%, corresponding to a greater than cut-in wind speed and less than high winds, the derating factor is utilized to maintain the power generated at the individual wind turbines 100 and the power generated in wind turbine plant 300 at 100%. If the derating factor includes a derating factor value of less than 100%, corresponding to a high wind event, the derating factor is utilized to reduce the power generated at the individual wind turbines 100 and the power generated in wind turbine plant 300. The reduction in power production reduces the load stresses on the wind turbines 100 that develop in high wind conditions.

In addition to reducing the power produced and the load stresses on the wind turbine 100, the command signal 303 may also instruct the wind turbine 100 to adjust the cut-out wind speed. The "cut-out wind speed" as utilized herein is a wind speed in which the wind turbine will automatically initiate shut-down of power production. Shutdown may be facilitated by any suitable shutdown technique, including, but not limited to slowing and adjusting the pitch of the blades 108 and/or ceasing power generation at the generator 120. According to embodiments of the present invention, at reduced power generation levels for the individual wind turbine 100, the cut-out wind speed may be adjusted upward. The adjusted cut-out speeds may be determined for different wind speeds versus power by historical or otherwise predetermined values or relationships that at any given instant in time. In one embodiment, the adjusted cut-out wind speed may be defined at the wind speed value where further derating of power would either be zero power or a point at which operation above those wind speeds would result in an unsuitable degradation of controllability.

The reduction in power at the individual wind turbine 100 may be accomplished using any known method for reducing the shaft 116 speed and/or torque. An induction generator's ability to generate power is equivalent to its ability to produce torque at rotational speeds. When a torque is exerted on the generator's rotor in the opposite direction of its rotation, the mechanical energy of the rotor is converted to electrical energy. Therefore, a reduction in the amount of torque exerted on the generator's rotor (e.g., via a reduction in load or other suitable change in settings at the generator) may likewise reduce the power generated by the wind turbine. Likewise, the pitch angles of blades 108 (FIG. 1) may be adjusted by pitch gear assembly 115 (FIG. 2) to alter the aerodynamic interface between the wind and the blades 108 and thereby reduce the force transferred from the wind to the blades 108. The reduction in force on the blades 108 reduces the rotational speed of the generator shaft, thereby reducing the amount of power produced.

Reducing power results in reduces loads and stresses on the turbines by reducing rotor speed and rotor torque. While any single power reduction method may be used, the wind turbines 100 preferably utilize combinations of power reduction methods to provide efficient and safe operation. For example, power reduction may be achieved by controllably altering both the torque at the generator and the pitch of blades 108 (FIG. 1). In this embodiment, the power that may be produced by the wind turbines 100 is the product of the derated rotor speed and the derated torque.

While the above has been described as a control system for controlling wind turbine plants 300, the individual wind turbines may also include an individual cut-out wind speed which is based on wind speed and adjusted to compensate for load withstand capability at reduced power, rotor speed or rotor torque levels. Specifically, a wind turbine 100 is permitted to operate at reduced power/high wind levels if so commanded by the plant control 301. However, should the plant control 301 fail to send a signal for reduction in power level at high wind conditions that would result in the wind turbine load carrying capability being exceeded, the wind turbine cuts-out and shuts down due to the high wind.

In another embodiment, the derating factor may be determined for a plurality of curves, algorithms, look-up tables or combinations of derating factor determining methods. For example, a plurality of derating curves may be utilized at different measurement values. In one example, a first derating curve is provided with average wind speeds determined over a 10 minute interval. A second derating curve is provided with average wind speeds determined over a 30 second interval. The derating factor communicated to the wind turbines may be the more conservative (or lower) value or may be a more aggressive (or higher) of the two numbers, depending upon the desired operational parameters of the plant 300. In one embodiment, the wind speed utilized to determine the derating factor communicated by the plant control 301 to the wind turbines 100 may be selected to be a wind speed that provides the safest, or lowest wind speed operation of the individual wind turbines. The plurality of curves are created such that the wind turbines 100 are operating below its protection limits.

FIG. 4 shows an exemplary derating curve for use with the present method and system. The derating curve includes a percentage power (i.e., derating factor) that corresponds to a wind speed. As discussed above, the wind speed may be determined at a single point or location or may be an average taken over a plurality of points or locations. The wind speed is correlated to a derating factor. While not limited to the curve or the values shown in FIG. 4, FIG. 4 shows a cut-in wind speed 401 of about 5 m/s. In addition, the cut-out wind speed 403 is about 58 m/s.

Figure 5:
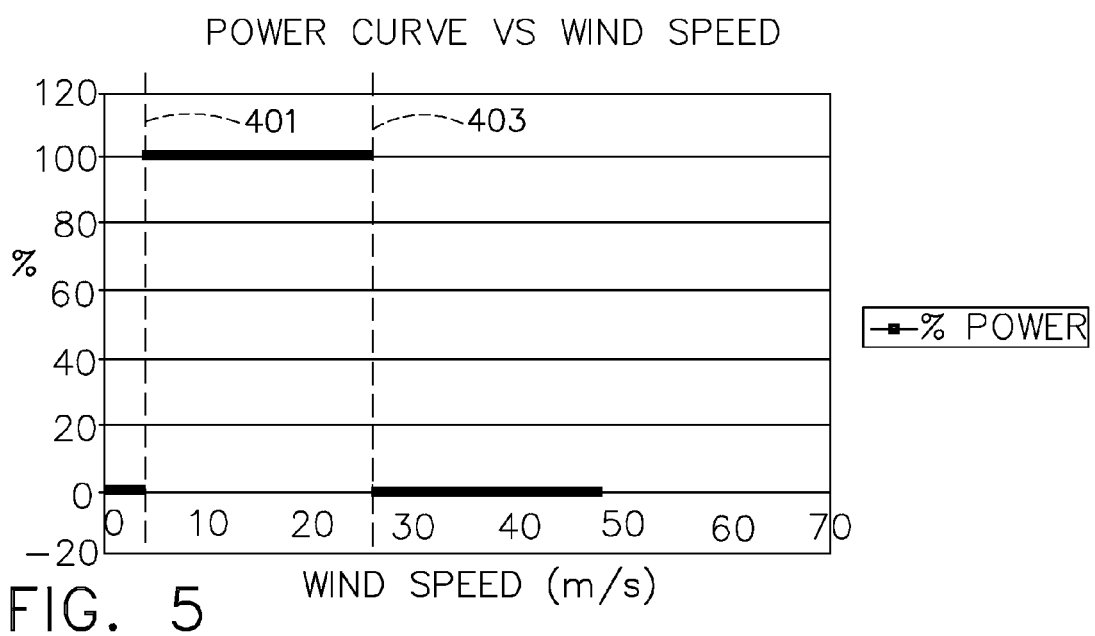
FIG. 5 shows a comparative power curve showing exemplary wind speed to power factors according to known wind turbine plants.

FIG. 5 shows an exemplary power curve for a wind turbine 100 that operates according to known control schemes. As shown in FIG. 5, the cut-in wind speed is about 5 m/s and the cut-out 10 minute average wind speed is about 25 m/s averaged. In a plant system 300, a wind speed of greater than about 25 m/s results in a total power loss of the plant, wherein each wind turbine 100 shuts down due to high wind. In contrast, as shown in FIG. 4, the present invention utilizes a reduced power and corresponding reduced shaft speed and/or torque to permit operation at a wind speed of up to about 58 m/s without requiring shutdown of any of the wind turbines 100 within the wind turbine plant 300.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for operating a wind turbine plant comprising:
providing a plurality of wind turbines, the wind turbines each having a turbine rotor including at least one blade mounted to a rotatable turbine shaft and an induction generator having a stator and a rotor coupled to the turbine shaft for rotation therewith; the wind turbines each being configurable to provide a variable amount of power;
providing a control capable of communicating with the plurality of wind turbines;
measuring a wind speed;
determining by the control a power derating factor in response to the measured wind speed;
communicating by the control the determined derating factor to the plurality of wind turbines; and
adjusting the amount of power generated by each of the plurality of wind turbines in response to the power derating factor; and
adjusting a cut-out wind speed of one or more of the plurality of wind turbines upward in response to the derating factor, wherein adjusting the cut-out wind speed upwards permits operation of the wind turbine plants during a high wind event.

2. The method of claim 1, wherein the adjusting of the cut-out wind speed includes increasing the cut-out speed in response to a derating factor that decreases power production.

3. The method of claim 1, wherein the adjusting includes varying the pitch of one or more blades of the wind turbine to vary the rotational speed.

4. The method of claim 1, wherein the adjusting includes varying generator torque.

5. The method of claim 1, wherein the adjusting includes varying both the pitch of one or more blades of the wind turbine to vary the rotational speed and generator torque.

6. The method of claim 1, wherein the determining includes determination of a plurality of derating factors and selecting a single derating factor from the plurality of derating factors to communicate to the plurality of wind turbines.

7. The method of claim 1, wherein the measuring includes measuring wind speed at one or more of the wind turbines.

8. The method of claim 1, wherein the measuring includes measuring wind speed at a location remote from the plurality of wind turbines.

9. The method of claim 1, wherein the measuring includes measuring wind speed at one or more of the plurality of wind turbines.

10. The method of claim 1, wherein the measuring includes obtaining a forecasted wind speed.

11. The method of claim 1, wherein the power derating factor is 100% below a predetermined value of wind speed.

12. The method of claim 1, wherein the power derating factor is less than 100% above a predetermined value of wind speed.

13. A wind turbine plant system comprising:
a plurality of wind turbines configurable to provide a variable amount of power;
a control capable of communicating with the plurality of wind turbines; and
a wind speed measurement device;
wherein the control determines a power derating factor in response to a measured wind speed and communicates the power derating factor to the plurality of wind turbines to adjust the amount of power provided by each wind turbine of the plurality of wind turbines in response to the power derating factor; and
wherein a cut-out wind speed of each of the plurality of wind turbine turbines is adjusted upward in response to the derating factor, wherein adjusting the cut-out wind speed upward permits operation of the wind turbine plant during a high wind event.

14. The system of claim 13, wherein the adjusting of the cut-out wind speed includes increasing the cut-out speed in response to a derating factor that decreases power production.

15. The system of claim 13, wherein the adjusting includes varying the pitch of one or more blades of the at least one wind turbine to vary the rotational speed.

16. The system of claim 13, wherein the adjusting includes varying generator torque.

17. The system of claim 13, wherein the power derating factor is 100% below a predetermined value of wind speed.

18. The system of claim 13, wherein the power derating factor is less than 100% above a predetermined value of wind speed.

* * * * *